United States Patent
Nakagawa et al.

(10) Patent No.: US 7,330,285 B2
(45) Date of Patent: Feb. 12, 2008

(54) IMAGE PROCESSING APPARATUS AND PRINT CONTROL METHOD THEREFOR

(75) Inventors: Toshitaka Nakagawa, Iwatsuki (JP); Yuichi Shiho, Iwatsuki (JP); Minoru Yoshida, Iwatsuki (JP); Tsuyoshi Watanabe, Iwatsuki (JP); Manabu Hayashi, Iwatsuki (JP); Takashi Sakayama, Ebina (JP); Toshiyu Ishikawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 953 days.

(21) Appl. No.: 10/373,762

(22) Filed: Feb. 27, 2003

(65) Prior Publication Data

US 2004/0017576 A1 Jan. 29, 2004

(30) Foreign Application Priority Data

Jul. 25, 2002 (JP) .............................. 2002-216684

(51) Int. Cl.
*G06K 1/00* (2006.01)

(52) U.S. Cl. ..................... 358/1.2; 358/1.1; 358/401; 358/449; 399/86; 271/9.06

(58) Field of Classification Search ................ 358/1.2, 358/449, 1.15, 401; 399/86, 124; 271/9.09, 271/3.06, 9.04, 9.05, 9.06
See application file for complete search history.

(56) References Cited

U.S. PATENT DOCUMENTS

| | | | | |
|---|---|---|---|---|
| 4,449,705 A | * | 5/1984 | Shibuya et al. ............. 271/9.09 |
| 5,311,259 A | * | 5/1994 | Moriya et al. ................ 399/86 |
| 5,428,459 A | * | 6/1995 | Asai ........................... 358/449 |
| 5,610,728 A | * | 3/1997 | Sobue ......................... 358/449 |
| 6,021,186 A | * | 2/2000 | Suzuki et al. ........... 379/100.12 |
| 6,058,249 A | * | 5/2000 | Matsuda et al. ........... 358/1.14 |
| 6,172,763 B1 | * | 1/2001 | Toyoda et al. ............. 358/1.15 |
| 6,559,971 B1 | * | 5/2003 | Watts et al. ................. 358/1.2 |

FOREIGN PATENT DOCUMENTS

| JP | A 07-244566 | 9/1995 |
|---|---|---|
| JP | A 8-142439 | 6/1996 |
| JP | A 2001-069300 | 3/2001 |
| JP | A 2002-016784 | 1/2002 |

\* cited by examiner

*Primary Examiner*—Kimberly A. Williams
(74) *Attorney, Agent, or Firm*—Oliff & Berridge, PLC (57) ABSTRACT

An image processing apparatus for processing image data comprises a printer for printing processed image data on recording paper; an image data receiver for receiving image data transmitted thereto via a network; storage unit for storing the image data received by the image receiver; a print controller for controlling printing of the image data stored in the storage unit on the recording paper; and one or more feed trays that load recording paper loaded therein and feed the loaded recording paper to the printer, wherein, if recording paper of the image data is larger in size than any recording paper loaded in the feed trays, the print controller reduces in size image data to fit with largest-size recording paper of the recording paper loaded in the feed trays, and prints the size-reduced image data on the largest-size paper.

16 Claims, 5 Drawing Sheets

IMAGE PROCESSING APPARATUS AND PRINT CONTROL METHOD THEREFOR

BACKGROUND OF THE INVENTION

1. Field of the Invention

The present invention relates to an image processing apparatus and a print control method thereof More particularly, the present invention relates to an image processing apparatus for printing image data received via a network, etc., and a print control method therefor.

2. Description of the Related Art

Recently, image processing apparatuses which serve as a composite machine incorporating copier and printer functions as well as a facsimile function have been developed.

Conventionally, an image received in the form of facsimile signals (hereinafter referred to as "facsimile image") is controlled according to ITU-T Recommendation T.30. Thus, a sending terminal performs negotiations with a destination terminal using a facsimile protocol, adjusts the size of the image to fit with the recording paper size printable at the destination terminal, and transmits the adjusted data to the destination terminal.

When sender's record including the date of sending, the sender's telephone number, the sender's name, the number of pages, etc. are added on the header portion of a facsimile image, the image size of the original image at the sending terminal becomes larger than the image size to be printed at the destination terminal. Accordingly, a technique that the destination terminal reduces in size the received image at a predetermined magnification factor to fit with the image size suitable for the destination terminal has been known. This technique, however, is likely to suffer from a problem that when the image transmitted from the sending terminal is reduced at the destination terminal, the destination terminal cannot faithfully reproduce the image transmitted from the sending terminal.

In order to overcome the problem, Japanese Patent Laid-Open No. 8-142439 discloses a technique of making a control such that when a received image is to be stored, such an image is not reduced, and when an image is received via a network or the like (for example, an image transmitted from a personal computer or the like), size reduction of such an image is inhibited.

The technique disclosed in Japanese Patent Laid-Open No. 8-142439, however, is only applicable to the situation in which recording paper of a printable size is loaded at the destination terminal. In Internet facsimile communications, however, an image is transmitted without taking into account the recording paper size available at the destination terminal. Therefore, problems may arise that when an image data of unprintable-size is received in the Internet facsimile communications, the destination terminal cannot print out the received image data.

SUMMARY OF THE INVENTION

The present invention has been made in view of the above circumstances and provides an image processing apparatus for automatically reducing or scaling down image data transmitted from an external information processing apparatus such as a personal computer via a network to fit with the size of recording paper loaded in the sheet feeder, while not reducing image data received in the form of facsimile signals, and a print control method therefor.

In one aspect of the present invention, an image processing apparatus for processing image data, comprises printing unit for printing processed image data on recording paper; image data receiving unit for receiving image data transmitted thereto via a network; storage unit for storing the image data received by the image receiving unit; print control unit for controlling printing of the image data stored in the storage unit on the recording paper; and one or more feed trays that load recording paper loaded therein and feed the loaded recording paper to the printing unit, wherein, if recording paper of the image data is larger in size than any recording paper loaded in the feed trays, the print control unit reduces in size image data to fit with largest-size recording paper of the recording paper loaded in the feed trays, and prints the size-reduced image data on the largest-size paper.

In another aspect of the present invention, a print control method for an image processing apparatus has one or more feed trays and designed to print received image data on recording paper, wherein, when image data transmitted via a network is received and if recording paper size of the received image data is larger than size of any recording paper loaded in the feed trays, the received image data is reduced in size to fit with largest-size recording paper of the recording paper in the feed trays, and the reduced size image data is printed out.

The present invention offers the advantage that image data transmitted from an external information processing apparatus such as a personal computer via a network is automatically reduced to fit with a recording paper size and printed thereon, so that printing of image data is possible even when image data that is different in size from any of the recording papers prepared for the destination terminal. This invention further offers the advantage that image data received in the form of facsimile signals can be printed on the recording paper having the size of the image data, because the image processing apparatus waits until the above-mentioned paper is loaded even if the recording paper corresponding to this image size is not temporarily loaded.

BRIEF DESCRIPTION OF THE DRAWINGS

Embodiments of the present invention will be described in detaile based on the follwing drawings, wherein.

DESCRIPTION OF THE EMBODIMENT

Embodiments of an image processing apparatus and a print control method therefor according to the present invention will be explained in detail with reference to the accompanying drawings.

Figure 1:
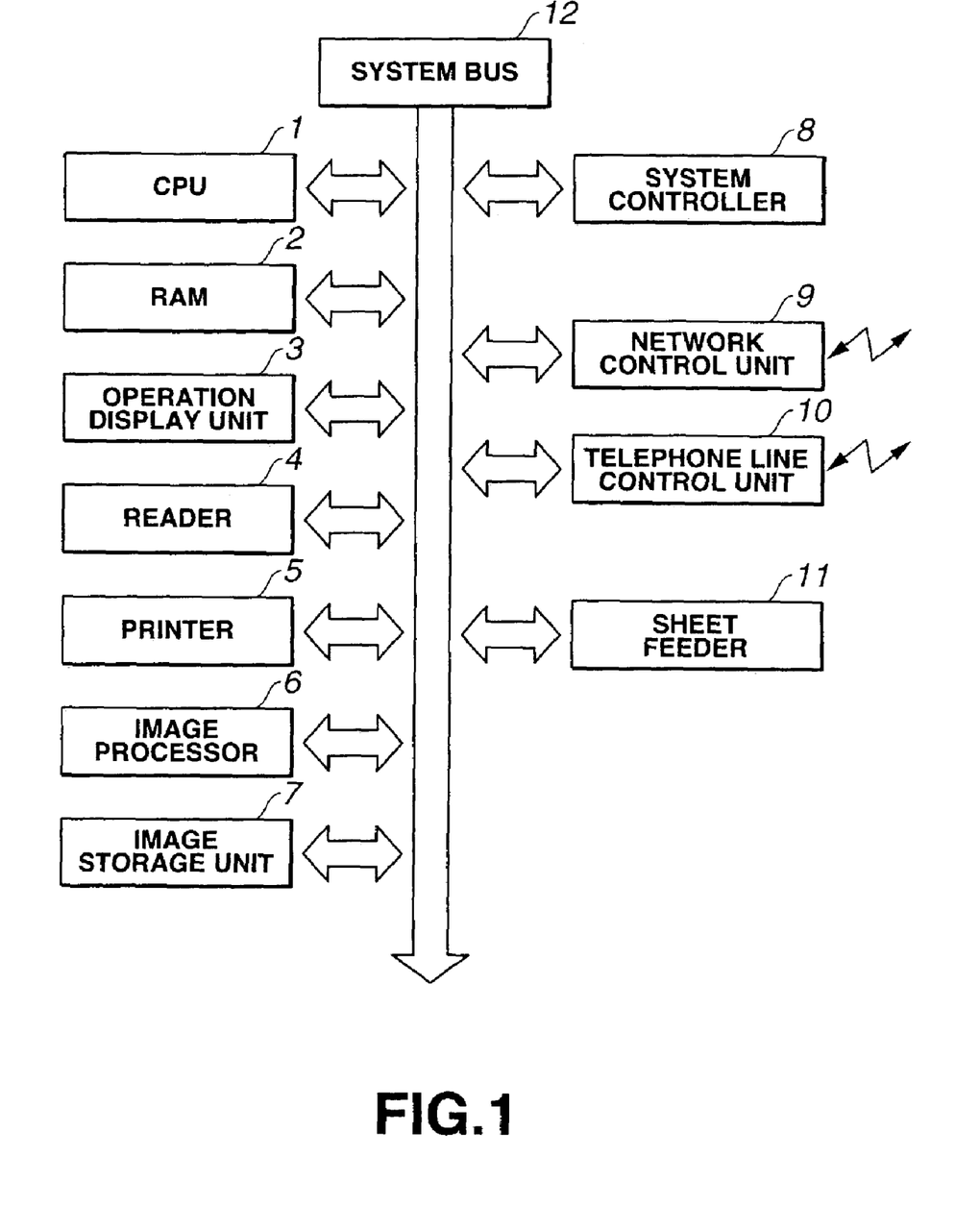
FIG. 1 is a block diagram showing the configuration of an image processing apparatus according to one embodiment of the present invention.

FIG. 1 is a block diagram showing a schematic configuration of one embodiment of an image processing apparatus according to the present invention.

Referring to FIG. 1, the image processing apparatus comprises a CPU (Central Processing Unit) 1, a RAM (Random Access Memory) 2, an operation display unit 3, a reader 4, a printer 5, an image processor 6, an image storage unit 7, a system controller 8, a network control unit 9, a telephone line control unit 10 and a sheet feeder 11. These components communicate with one another via a system bus 12 to exchange data among them.

The CPU 1 performs overall controls of the image processing apparatus.

The RAM 2 contains work areas allocated as image memory, image buffer, reading line buffer, recording line buffer, user registration data area, and work area use for control program and the like.

The operation display unit 3 comprises a liquid crystal display touch panel that displays state of the image processing apparatus, state of communication, messages to user or the like. It is also used for inputting instructions and settings for each component of the image processing apparatus, for instructing start timing of transmission during communication, for making settings of destination devices, etc.

The reader 4 optically reads a document sheet to be transmitted through a telephone line, a document sheet to be printed in the printer or the like, and converts the data on the document sheet into electrical image data.

The printer 5 prints image data of the document sheet read by the reader 4, image data received through a telephone line (facsimile document), and image data received via a network on recording paper.

The image processor 6 performs encoding, decoding, enlargement, reduction, etc. of the image data.

The image storage unit 7 stores the image data.

The system controller 8 comprises a ROM (Read Only Memory) that has stored therein a program for performing the overall control of the image processing apparatus.

The Network control unit 9 connects the image processing apparatus to a network in order to receive image data transmitted from an external information processing apparatus such as a PC (personal computer) and image data transmitted from an internet facsimile machine.

The telephone line control unit 10 comprises a modem or a network control unit 9 for connecting the image processing apparatus to a telephone line.

The sheet feeder 11 is of multi-stacked tray type that comprises plural feed trays capable of automatically feeding recording paper. Each feed tray is provided with a recording paper size detector for detecting the size of the recording paper loaded therein. The recording paper size detector identifies the size of the recording paper by detecting, for example, the position of a recording paper guide disposed on the upper surface of the sheet feeder 11. The sheet feeder 11 may comprise a recording paper size setting unit that sets the size of a recording paper to be loaded for each feed tray. The size of the recording paper to be loaded may be set for each tray through the operation display unit 3 or by using a "hardware" such as mechanical switches. Although this embodiment is described in terms of multi-stacked trays by way of example, it should be understood that the embodiment is also applicable to the sheet feeder 11 comprising a single tray.

Figure 2:
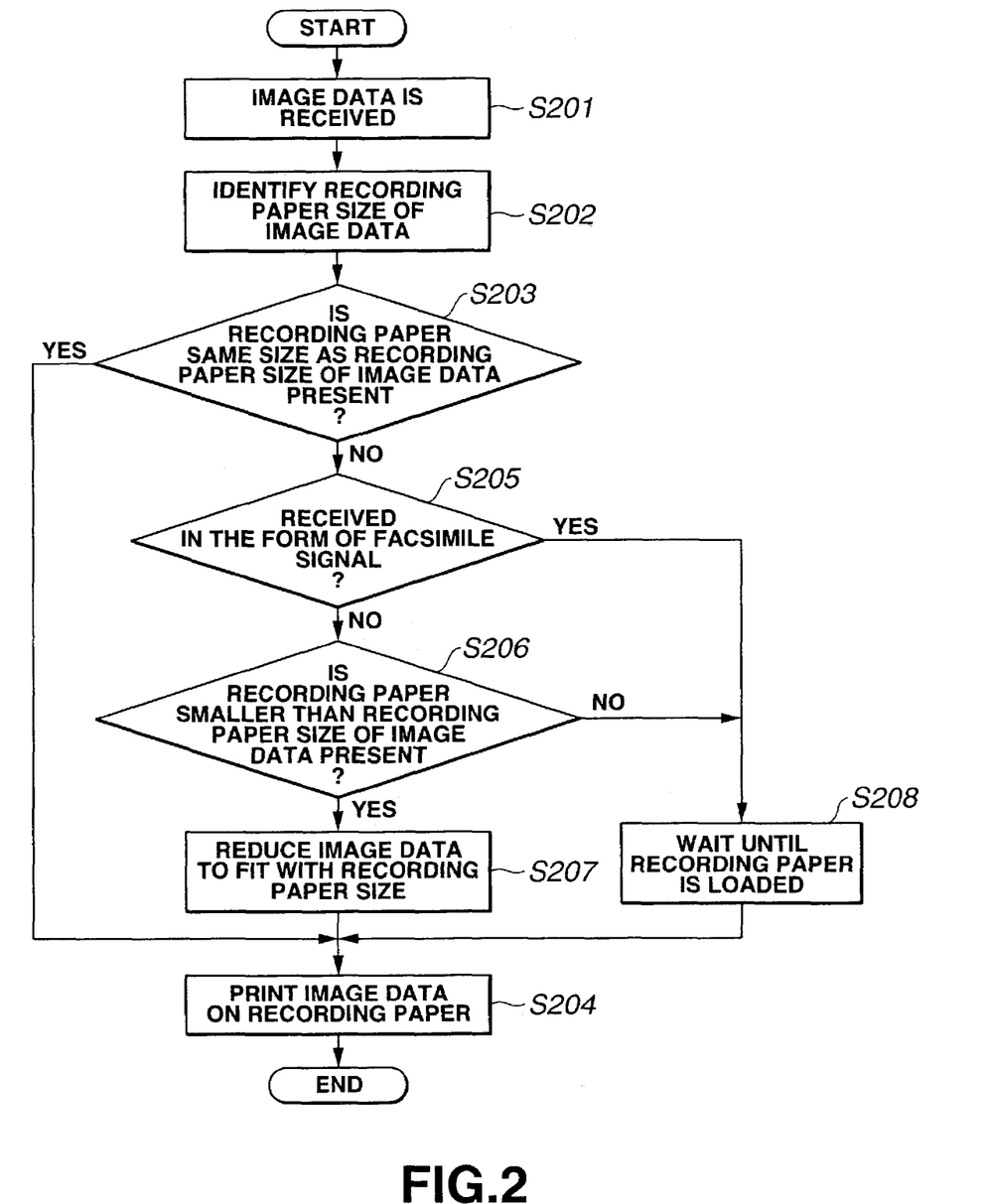
FIG. 2 is a flowchart illustrating a first process sequence of the image processing apparatus when image data is received.

Next, a first process sequence performed by the image processing apparatus when an image data is received will be described with reference to the flowchart of FIG. 2.

When the image processing apparatus receives an image data (step S210), the recording paper size of the image data is identified (step S202), and then it is confirmed whether recording paper having the same size as the received image data is loaded in the sheet feeder 11(step 203).

If recording paper having the same size as the received image data is loaded in the sheet feeder 11 (i.e., the answer in step S203 is YES), the image data is printed on the recording paper (step S204) and the process terminates.

On the other hand, if recording paper having the same size as the image data is not loaded in the sheet feeder 11 (i.e., the answer in step S203 is NO), then it is confirmed whether the image data was received from an external information processing apparatus such as a personal computer via the network control unit 9 or received in the form of facsimile signals via the telephone line control unit 10 (step S205).

If the image data is confirmed to be received via the network control unit 9 (i.e., the answer in step S205 is NO), then it is confirmed whether recording paper that is smaller in size than the recording paper of the image data is loaded in the sheet feeder 11 (step S206). If recording paper that is smaller in size than the recording paper of the image data is loaded in the sheet feeder 11 (i.e., the answer in step S206 is YES), the image data is reduced to fit with the size of the recording paper (step S207), the reduced image data is printed on the recording paper (step S204), and the process terminates.

If it is confirmed in step S205 that the image data is received in the form of facsimile signals via the telephone line control unit 10 (i.e., the answer in step S205 is YES) and further confirmed in step S206 that recording paper smaller in size than the recording paper of the image data is not loaded in the sheet feeder 11 (i.e., the answer in step S206 is NO), the process waits until such a recording paper is loaded in the sheet feeder 11 (step S208). Once an appropriate recording paper is loaded in the sheet feeder 11, the image data is printed on the recording paper (step S203), and the process terminates.

During the period of waiting until the appropriate recording paper is loaded in the sheet feeder 11 in step S208, the process may be so configured that the operation display unit 3 displays a message for urging the user to load the recording paper or a message is transmitted for urging an administrator that administrates the image processing apparatus (e.g., a control apparatus such as a personal computer connected with the image processing apparatus via a network) to load recording paper.

Figure 3:
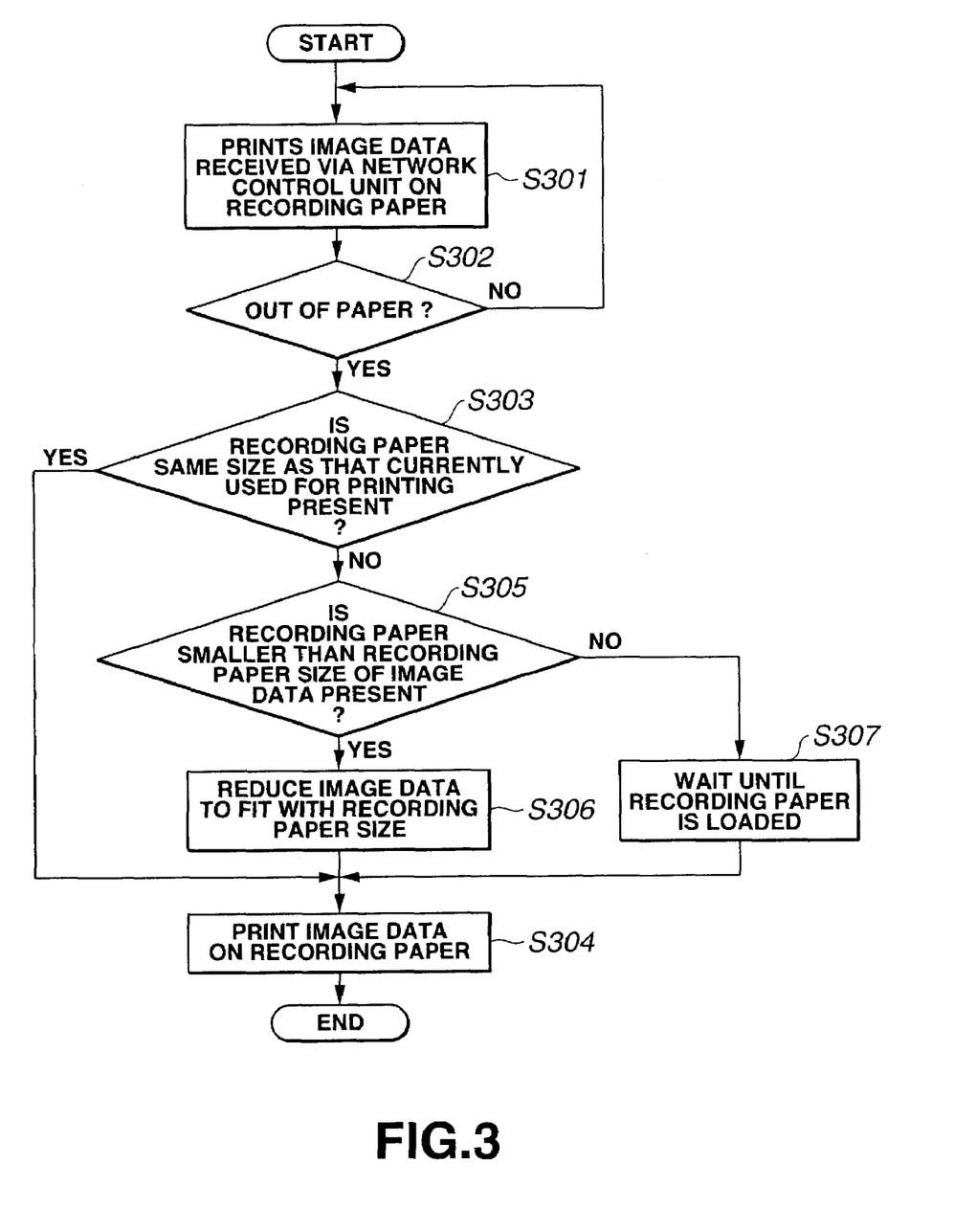
FIG. 3 is a flowchart illustrating a process of the image processing apparatus if a paper-out condition occurs during printing the image data received by a network control unit 9 on a recording paper.

Referring now to the flowchart of FIG. 3, processes performed by the image processing apparatus when recording paper runs out of stock during the printing of image data received by the network control unit 9 will be described.

The image data received by the network control unit 9 is printed on recording paper (step S301). If recording paper runs out of stock during this printing operation (i.e., the answer in step S302 is YES), it is confirmed whether recording paper having the same size as that currently used for printing is loaded in any other feed tray of the sheet feeder 11.

If recording paper having the same size as that currently used for printing is loaded in any other feed tray of the sheet feeder 11 (i.e., the answer in step S303 is YES), the remaining image data is printed on the recording paper loaded therein (step S304), and the process terminates.

On the other hand, if recording paper having the same size as that currently used for printing is not loaded in any other feed tray of the sheet feeder 11 (i.e., the answer in step S303 is NO), it is confirmed whether recording paper smaller in size than the recording paper of the image data is loaded in the sheet feeder 11.

If a recording paper smaller in size than the recording paper of the image data is loaded in the sheet feeder 11 (i.e., the answer in step S305 is YES), the remaining image data is reduced to fit with the size of this smaller recording sheet (step S306), the reduced image data is printed on this recording paper (step S304), and the process terminates.

If recording paper smaller in size than the recording paper of the image data is not loaded in the sheet feeder 11 (i.e., the answer in step S305 is NO), the process waits until recording paper is loaded in the sheet feeder 11 (step S307). Once the recording paper is loaded in the sheet feeder 11, the remaining image data is printed on this recording paper (step S304) and the process terminates.

During waiting until the recording paper is loaded in the sheet feeder 11 in step S307, the process may be configured to display on the operation display unit 3 a message for urging the user to load the recording paper or to transmit a message for urging an administrator for administrating the image processing apparatus to load the recording paper.

Figure 4A:
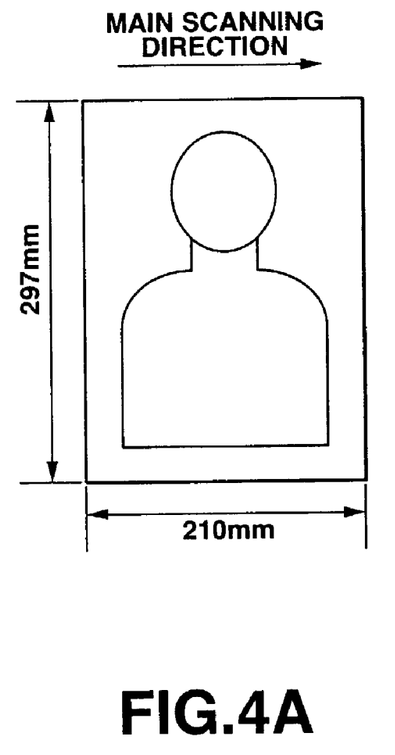
FIGS. 4A and 4B show diagrams illustrating a process of splitting an image and printing the split images on corresponding recording paper.
Figure 4B:
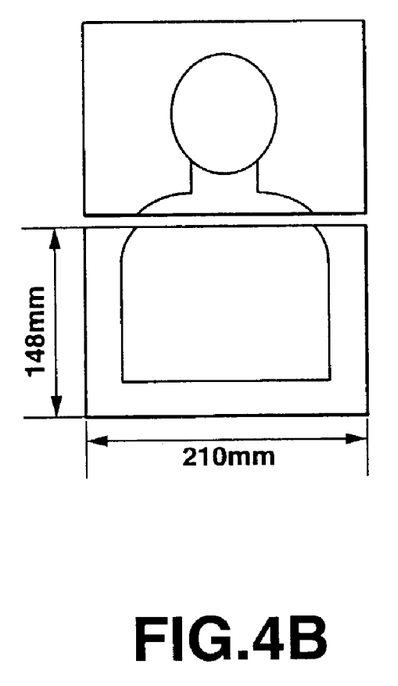

FIGS. 4A and 4B show diagrams illustrating a process of splitting image data into a plural pieces and printing the split image data on a corresponding plural recording papers.

FIG. 4A shows the case that an "A3 size" image data is printed on one "A3 size" recording paper, while FIG. 4B shows the case that the "A3 size" image data is split and printed on two "A4 size" recording papers.

When scanning of image of "A3 size (210 mm×297 mm)" paper is performed with the main scanning direction being set to be along the "210 mm" long side as shown in FIG. 4A, the image data can be split in two so that the image is printed on two "A4 size (148 mm×210 mm)" paper as shown in FIG. 4B.

That is, even when recording paper having the same size as that of the recording paper of the image data received by the image processing apparatus is not loaded in any of the feed trays, if recording paper having a length that is the same as the length of the image data extending along the main scanning direction is loaded in any of the feed trays, the image data can be printed by splitting the image date and each of the split image data is printed on such paper.

Figure 5:
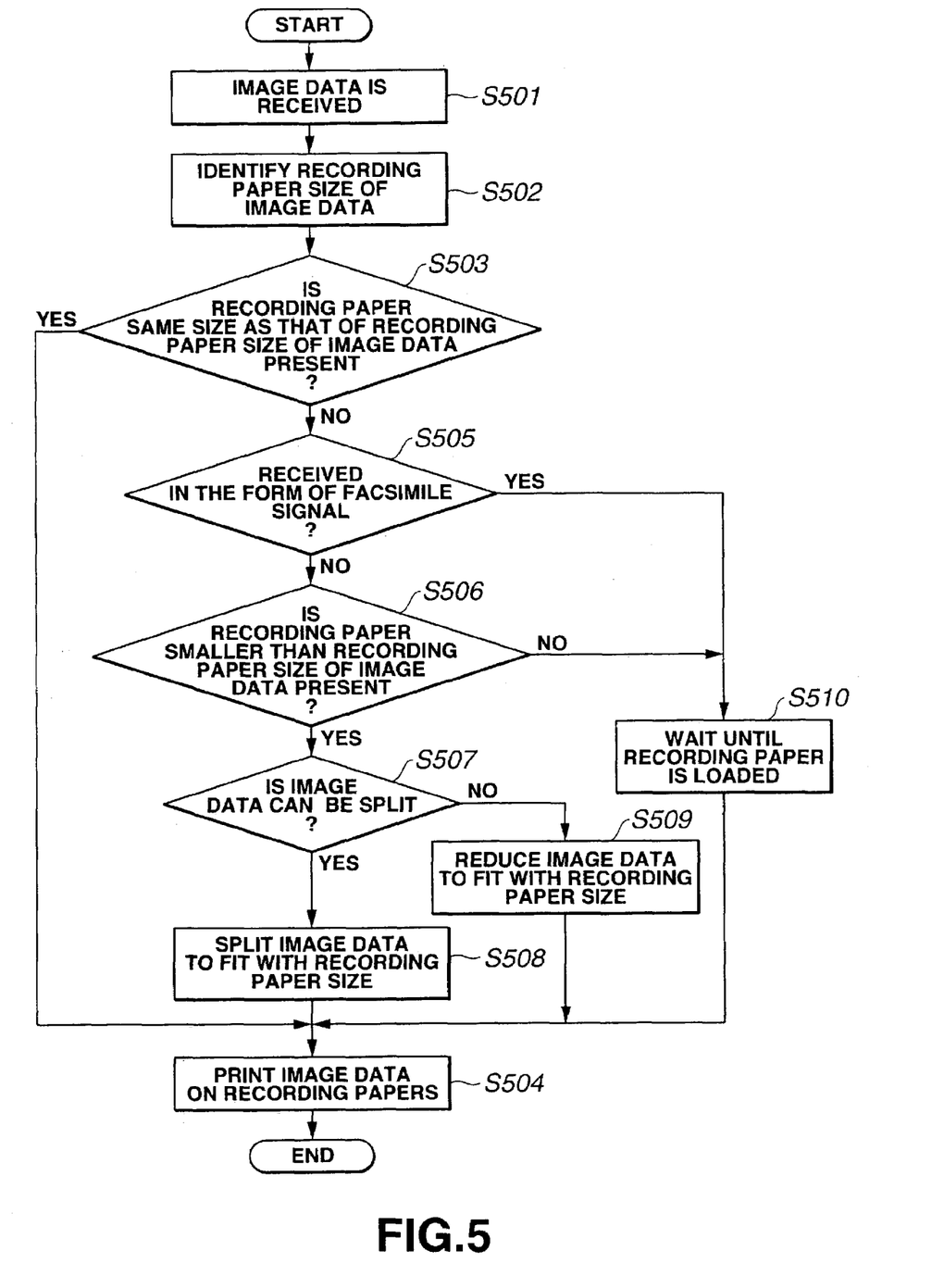
FIG. 5 is a flowchart illustrating a second process sequence of the image processing apparatus when image data is received.

Now, a second process sequence performed by the image processing apparatus that received an image data will be described with reference to the flowchart of FIG. 5.

Upon receiving image data (step S501), the image processing apparatus identifies the size of the recording paper of the image data (step S502), and confirms whether recording paper having the same size as the identified size of the recording paper of the image data is loaded in the sheet feeder 11 (step S503).

If recording paper having the same size as that of the recording paper of the image data is loaded in the sheet feeder 11 (i.e., the answer in step S503 is YES), the image data is printed on the recording paper (step S204), and the process terminates.

On the other hand, if recording paper having the same size as that of the recording paper of the image data is not loaded in the sheet feeder 11 (i.e., the answer in step S503 is NO), then it is confirmed whether the image data was received from an external information processing apparatus such as a personal computer via the network control unit 9 or received in the form of facsimile signals via the telephone line control unit 10 (step S505).

If the image data is confirmed as that received via the network control unit 9 (i.e., the answer in step S505 is NO), it is confirmed whether recording paper smaller than the printing paper of the received image data is loaded in the sheet feeder 11 (step S505). When recording paper smaller in size than the printing paper of the received image data is loaded in the sheet feeder 11 (i.e., the answer in step S506 is YES), and if the recording paper has a length that is coincident with a length of the paper of the image data extending along the main scanning direction, it is confirmed that the image data can be split (i.e., the answer in step S507 is YES). Thus, the image data is split to fit with this recording paper loaded in the sheet feeder 11 (step S508), each of the split pieces of image data is printed on the corresponding paper (step S504), and the process terminates.

On the other hand, if, in step S507, the recording paper smaller in size than the recording paper of the image data is not coincide with the side length of the image data extending along the main scanning direction, it is confirmed that the image data can not be split (i.e., the answer step S507 is NO). Then, the image data is reduced to fit with the recording paper size (step S509), the reduced image data is printed on this recording paper (step S504), and the process terminates.

If it is confirmed in step S505 that the image data is received in the form of facsimile signals via the telephone line control unit 10 (i.e., the answer in step S505 is YES) and further confirmed in step S506 that the recording paper that is smaller is size than that of the image data is not loaded in the sheet feeder 11 (i.e., the answer in step S506 is NO), the process waits until recording paper is loaded in the sheet feeder 11 (step S510). Once the recording paper is loaded in the sheet feeder 11, the image data is printed on the recording paper (step S504), and the process terminates.

During a period of waiting until the recording paper is loaded in the sheet feeder 11 in step S510, the process may be configured such as to display on the operation display unit 3 a message for urging the user to load the recording paper or to transmit a message for urging an administrator for administrating the image processing apparatus (e.g., an administration unit such as a personal computer connected with the image processing apparatus via a network) to load the recording paper.

What is claimed is:

1. An image processing apparatus for processing image data, comprising:
   a printing unit that prints processed image data on recording paper;
   an image data receiving unit that receives image data transmitted thereto via a telephone network and an internet network;
   a storage unit that stores the image data received by the image receiving unit;
   a print control unit that controls printing of the image data stored in the storage unit on the recording paper, wherein the print control unit performs different resizing operations based on whether the image data is non-facsimile data or facsimile data; and
   one or more feed trays that load recording paper therein and feed the loaded recording paper to the printing unit, wherein, if the image data is non-facsimile data and recording paper of the image data is larger in size than any recording paper loaded in the feed trays, the print control unit reduces in size image data to fit with largest-size recording paper of the recording paper loaded in the feed trays, and prints the size-reduced image data on the largest-size paper.

2. The image processing apparatus according to claim 1, further comprising notification unit that notifies a fact that recording paper runs out of stock from the feed trays.

3. The image processing apparatus according to claim 1, wherein the feed trays include a recording paper size detector that detects size of the recording paper.

4. The image processing apparatus according to claim 1, wherein the feed trays include recording paper size setting unit that sets size of the recording paper.

5. The image processing apparatus according to claim 1, wherein, when the recording paper runs out of stock during printing the image data on the recording paper, if recording paper having the same size as that currently used for printing is loaded in any feeding trays, the print control unit prints the image data on the same-size recording paper, whereas if recording paper having the same size as that currently used for printing is not loaded in any of the feeding trays, the print control unit reduces in size the image data to fit with largest-size recording paper of recording paper loaded in the feed trays, and prints the size-reduced image data on the largest-size paper.

6. The image processing apparatus according to claim 1, wherein the image data receiving unit receives image data transmitted from an internet facsimile machine via the network.

7. An image processing apparatus for processing image data, comprising:
  a printing unit that prints the processed image data on recording paper;
  an image data receiving unit that receives image data transmitted thereto via a network;
  a facsimile image data receiving unit that receives facsimile image data transmitted in the form of facsimile signals via a public line;
  a storage unit that stores the image data received by the image data receiving unit and the facsimile image data received by the facsimile image data receiving unit;
  a print control unit that controls printing of the image data and the facsimile image data stored in the storage unit on the recording paper, wherein the print control unit performs different resizing operations, based on whether the image data is non-facsimile data or facsimile data; and
  one or more feed trays that load recording paper therein and feed the loaded recording paper to the printing unit,
  wherein, if the image data is not in the form of a facsimile signal and the recording paper of the image data is larger in size than any recording paper loaded in the feed trays, the print control unit reduces in size the image data to fit with largest-size recording paper of the recording paper loaded in the feed trays, and prints the size-reduced image data on the largest-size recording paper, and
  wherein, if the recording paper of the facsimile image data is larger in size than any recording paper loaded in the feed trays, the print control unit waits until the recording paper having the size same as that of the recording paper of the facsimile image data is loaded in any of the feed trays without reducing in size the facsimile image data.

8. An image processing apparatus for processing image data, comprising:
  a printing unit that prints processed image data on recording paper;
  an image data receiving unit that receives image data transmitted thereto via a network;
  a facsimile image data receiving unit that receives facsimile image data transmitted in the form of facsimile signals via a public line;
  a storage unit that stores image data received by the image data receiving unit and image data received by the facsimile image data received by the facsimile image data receiving unit;
  a print control unit that controls printing of the image data and the facsimile image data stored in the storage unit on the recording paper; and
  one or more feed trays that load recording paper therein, and feed the loaded recording paper to the printing unit,
  wherein, when recording paper of the received image data is larger in size than any recording paper loaded in the feed trays:
  if recording paper having a length same as a length of the image data in main scanning direction of the image data is loaded in any of the feed trays, the print control unit splits the image data and prints the split image data on the recording paper; if recording paper having a length that same as a length of the image data in the main scanning direction of the image data is not loaded, the print control unit reduces paper size of the image data to fit with largest-size recording paper of recording paper loaded in the feed trays, and prints the size reduced image data on the-largest size paper; and
  when paper size of facsimile image data is larger than size of any recording paper loaded in the feed trays, the print control unit waits until recording paper having a size same as the paper size of the facsimile image data is loaded in any of the feed trays without reducing the paper size of the facsimile image data.

9. A print control method for an image processing apparatus having one or more feed trays and designed to print received image data on recording paper, comprising:
  receiving at least one of a facsimile and non-facsimile data transmitted via a network, wherein received data includes recording paper size and image data,
  determining whether recording paper size of the received data is larger than size of any recording paper loaded in the feed trays;
  reducing the received image data in size to fit with largest-size recording paper of the recording paper in the feed trays, and
  printing out the reduced size image data.

10. The print control method for the image processing apparatus as defined in claim 9, wherein when the recording paper loaded in the feed tray runs out of stock, the fact that the recording paper is out of stock is notified.

11. The print control method for the image processing apparatus as defined in claim 9, wherein the size of the recording paper is detected by the feed trays having the recording paper loaded therein.

12. The print control method for the image processing apparatus as defined in claim 9, wherein the size of the recording paper is set in the feed trays.

13. The print control method for the image processing apparatus as defined in claim 9,
  wherein when recording paper runs out of stock during printing an image data on recording paper:
  if recording paper having the same size as recording paper currently used for printing is loaded in any other feed trays, the image data is printed on the same-size recording paper;
  if recording paper having the same size as recording paper currently used for printing is not loaded in any other feed trays, the image data is reduced to fit with largest-size recording paper of recording paper loaded in any of the feed trays, and the reduced image data is printed on the largest-size paper.

14. The print control method for the image processing apparatus as defined in claim 9, wherein the image data is transmitted from an internet facsimile machine via the network.

15. A print control method for an image processing apparatus having one or more feed trays and designed to print received image data on recording paper, wherein, when non-facsimile image data transmitted via a network is received and if recording paper size of the received image data is larger than size of any recording paper loaded in the feed trays, the received image data is reduced to fit with largest size recording paper of any recording paper loaded in the feed trays, and the reduced size image data is printed out, and wherein when facsimile image data transmitted in the form of facsimile signal via a public line is received and if recording paper size of the received facsimile image data is larger than size of any recording paper loaded in the feed trays, the print control unit does not reduces the facsimile image data but waits until the recording paper having size same as the recording paper size of the facsimile image data is loaded in any of the feed trays.

16. A print control method for an image processing apparatus having one or more feed trays and designed to print received image data on recording paper, wherein when image data transmitted via a network is received and recording paper size of the received image data is larger than size of any recording paper loaded in the feed trays:

if recording paper having a length same as a length of the image data in a main scanning direction of the image data is loaded in any of the feed trays, the image data is split and the split image data are printed on the recording paper;

if recording paper having a length same as a length of the image data in the main scanning direction of the image data is not loaded in any of the feed trays, the print control unit reduces the image data to fit with largest-size recording paper of any recording paper loaded in the feed trays, and prints the reduced image data on the largest-size recording paper; and when facsimile image data transmitted in the form of facsimile signals via a public line is received and if recording paper size of the received facsimile image data is larger than size of any recording paper loaded in the feed trays, the print control unit waits until recording paper having the same size as the recording paper size of the facsimile image data is loaded in any of the feed trays without reducing the facsimile image data.

* * * * *